Aug. 18, 1964 W. A. HERPICH ETAL 3,145,008
VEHICLE BODY LOADING AND UNLOADING MECHANISM
Filed April 27, 1959 4 Sheets-Sheet 1

INVENTORS
WILLIAM A. HERPICH,
DONALD R. LONGMIRE,
BY
ATTORNEYS

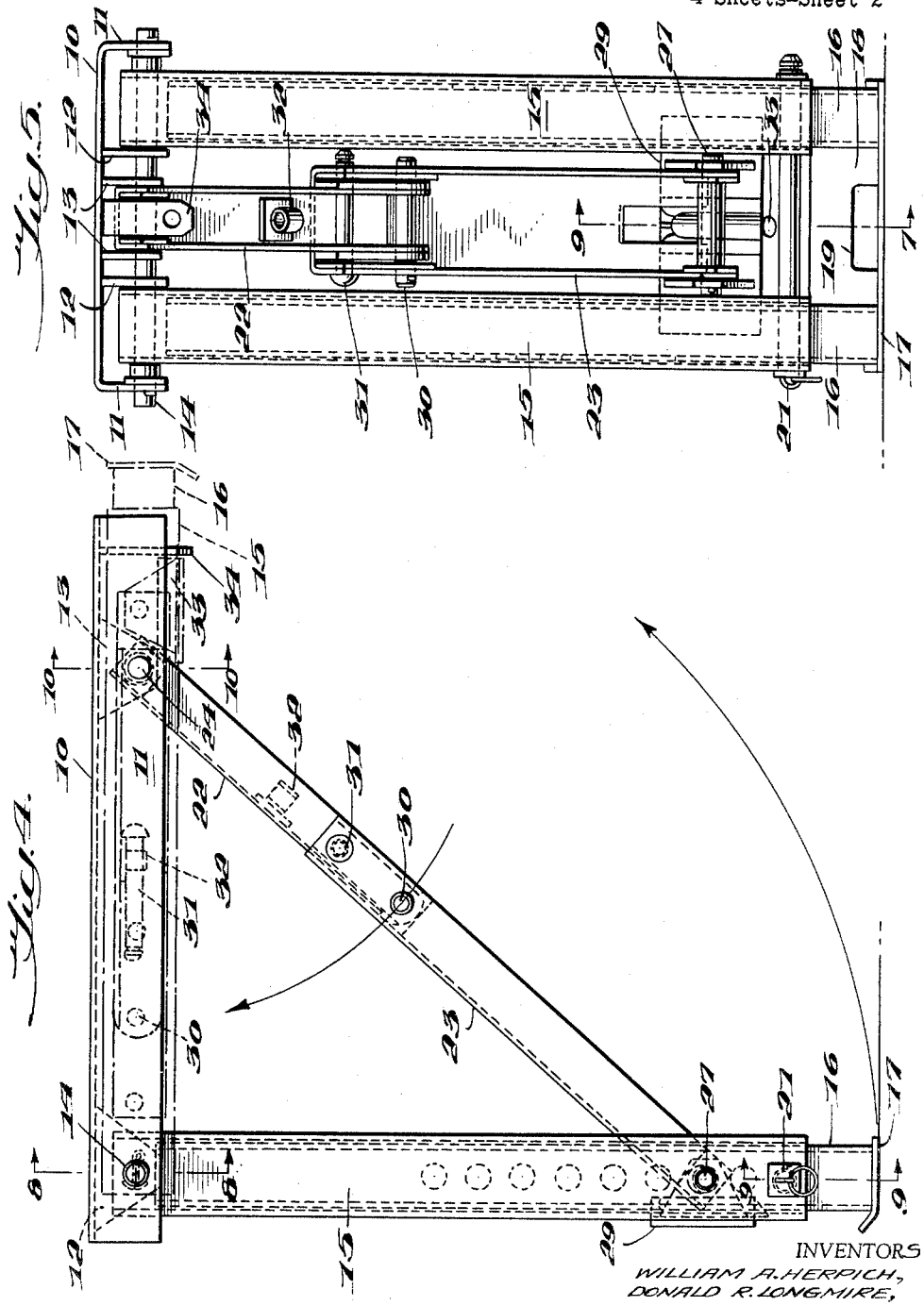

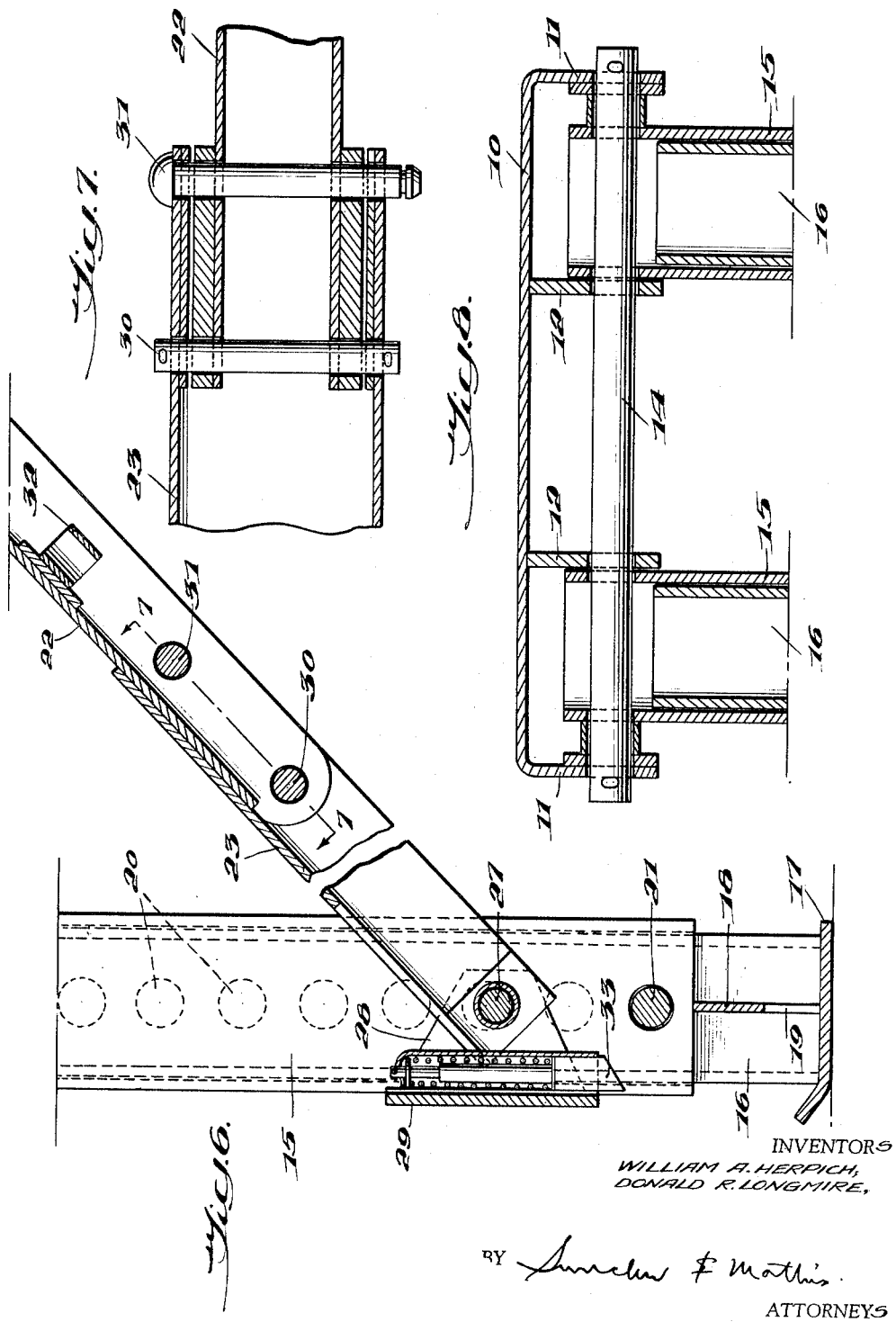

INVENTORS
WILLIAM A. HERPICH,
DONALD R. LONGMIRE,

BY

ATTORNEYS

United States Patent Office 3,145,008
Patented Aug. 18, 1964

3,145,008
VEHICLE BODY LOADING AND UNLOADING MECHANISM
William A. Herpich and Donald R. Longmire, Knoxville, Tenn., assignors to Dempster Brothers, Inc., Knoxville, Tenn., a corporation of Tennessee
Filed Apr. 27, 1959, Ser. No. 808,972
4 Claims. (Cl. 248—150)

This invention relates to improvements in vehicle body loading and unloading mechanism for picking up large containers of the order of vehicle bodies and for loading and unloading such containers with respect to a transport vehicle, separable therefrom.

It is often desirable to use large capacity containers for holding various types of lading and to provide for the loading and unloading of such containers with respect to a transporting vehicle. Such containers can be filled when sitting on the ground, floor or other surface, after which they can be picked up or loaded by power, transported to a remote point, and then set down or unloaded. It is also possible to load the body separate and apart from the motor vehicle and then transport the loaded body to a remote point and disconnect it from the vehicle while still loaded.

It is also desirable to support such containers in elevated positions, as, for example, beside a loading dock, railway car or platform, and to be capable of picking up the containers simply and directly and reloading them on the transport vehicle. Supporting legs will hold the container in an elevated position, but rigid legs are not satisfactory because of interference with the vehicle during transportation, as well as the danger of such legs getting in the way of the loading or unloading of the container with respect to the vehicle.

One object of this invention is to improve the construction of containers for loading and unloading mechanism, to provide for supporting of the containers in elevated positions in a practical and efficient manner.

Another object of the invention is to simplify and improve the provision of supporting legs for such a container to provide for supporting of the container in an elevated position off the transport vehicle and without interference by the supporting legs to the movement of the container onto and off the transport vehicle.

Still another object of the invention is to provide for adjustment of supporting legs for a container of the character described for folding or collapsing of the legs to a desirable extent, as well as for adjustment to different heights, and yet in a sturdy construction which will avoid the danger of collapsing of the legs during supporting of substantial weight thereby.

These objects may be accomplished, according to one embodiment of the invention, by constructing a body or detachable container with means for attachment to a transport vehicle to shift the container onto or off the vehicle, as desired. The container is provided also with a plurality of supporting legs connected therewith, so as to support the container in an elevated position when shifted off the transport vehicle.

Each of the legs preferably is adjustable in height, as well as collapsible, but when extended, it affords a sturdy and rigid support for the connected portion of the container.

The collapsing of the legs enables these to be located under a supported portion of the container, so as to hold the weight of the container and to be shifted to collapsed positions, so as not to interfere with the movement of the container onto or off the transport vehicle.

This embodiment of the invention is illustrated in the accompanying drawings, in which:

FIG. 4 is a side elevation of one of the leg assemblies;

FIG. 5 is an end elevation thereof;

FIG. 6 is a detail vertical section therethrough;

FIG. 7 is a detail cross section on the line 7—7 in FIG. 6;

FIG. 8 is a detail cross section through the leg supporting connection on the line 8—8 in FIG. 4;

Figure 1:
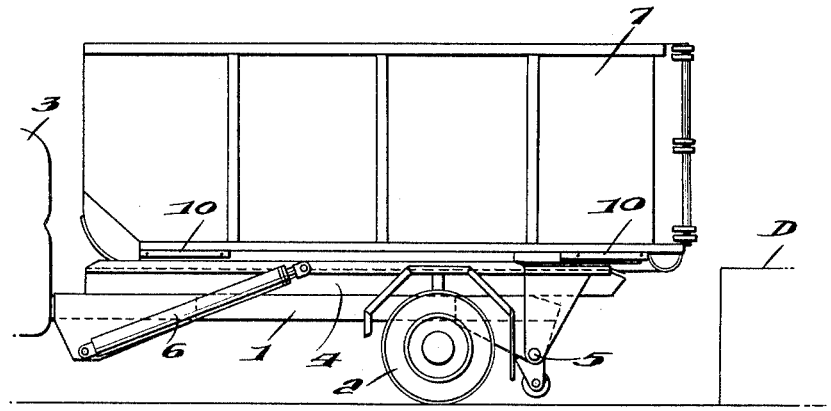
FIG. 1 is a side elevation of a transport vehicle and container, showing the supporting legs folded in transport position.
Figure 2:
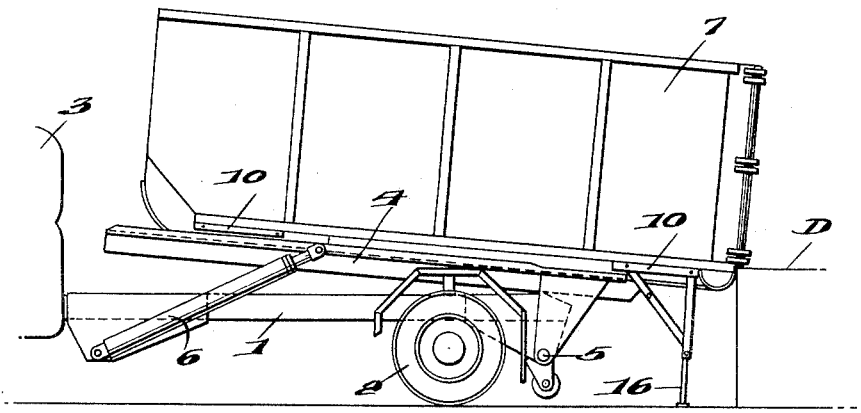
FIG. 2 is a similar view, with the rear legs lowered and the front legs folded.
Figure 3:
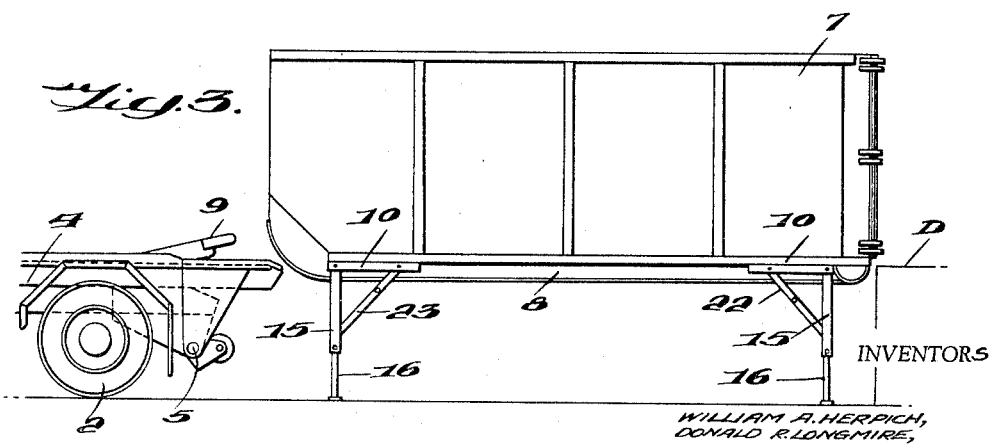
FIG. 3 is a similar view, showing both front and rear legs lowered.
Figure 9:
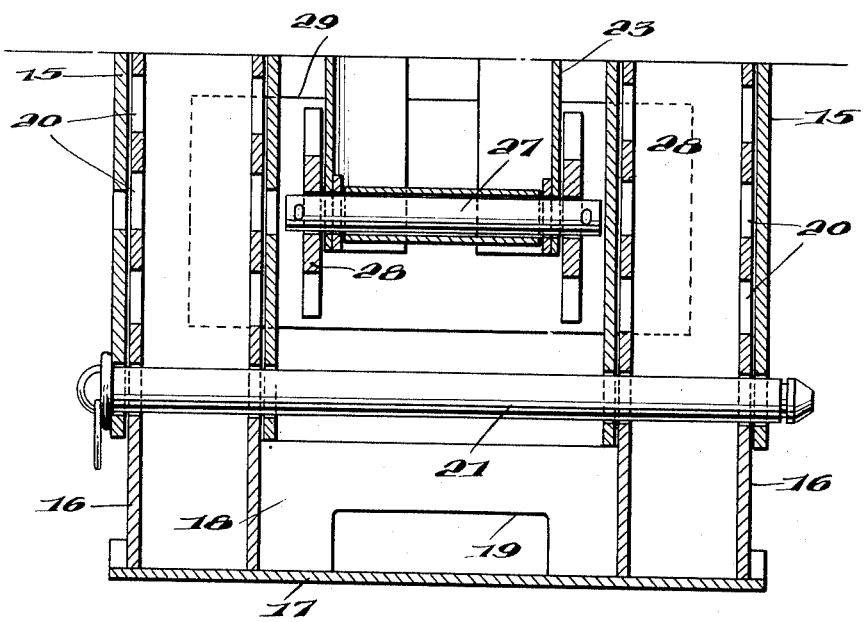
FIG. 9 is a detail cross section through the base of the leg on the line 9—9 in FIG. 4.

The invention is illustrated in FIGS. 1 to 3 as applied to a motor vehicle chassis of conventional form, wherein the chassis frame is generally indicated at 1 and is supported by the usual wheels 2. The vehicle is power driven and self-propelled under the control of the operator, who is usually located within a cab 3.

Mounted on the chassis frame 1 and extending lengthwise thereof is a tilting frame 4 pivotally supported at 5 on the chassis frame for tilting movement with respect thereto under control of hydraulic power devices 6.

A container is indicated generally at 7 and may be of any suitable size and character capable of being picked up on the transport vehicle and to be pulled up into carrying position with respect thereto. The container 7 is provided with an enclosure supported upon bottom structure, generally indicated at 8, which closes the bottom of the container 7 and is constructed so as to be moved lengthwise in skidding relation on the tilting frame 4. Any suitable means may be used for moving the container 7 lengthwise onto or off the tilting frame 4, although we prefer to employ for this purpose a shuttle structure including a bail 9 (FIG. 3) having detachable engagement with the subframe structure 8 of the container and being moved step-by-step lengthwise of the tilting frame 4 in either a forward or a rearward direction.

The foregoing structure is set forth more in detail in our prior application, Serial No. 744,107, filed June 24, 1958, to which reference is made for a more detailed explanation and disclosure of the structure employed for effecting the loading and unloading of the container with respect to the transport vehicle.

When it is desired to support the container 7 in an elevated position off the transport vehicle, as, for example, beside a loading dock, generally indicated at D in FIGS. 1 to 3, or adjacent a platform, railway car or the like, suitable supporting legs may be provided for the container, to support the latter. We prefer to employ legs which may be folded, as well as adjustable, and have shown in FIGS. 4 to 10 a preferred embodiment of such legs.

Referring to FIGS. 4, 5 and 8, we have shown a leg assembly, which may be secured in any suitable or desired manner to the subframe 8 of the container 7, preferably at each respective corner thereof and directly beneath the body of the container. This assembly provides not only for supporting the adjacent portion of the container sturdily and rigidly, but it is also capable of collapsing movement, so as not to interfere with the movement of the container onto and off the tilting frame.

Figure 10:
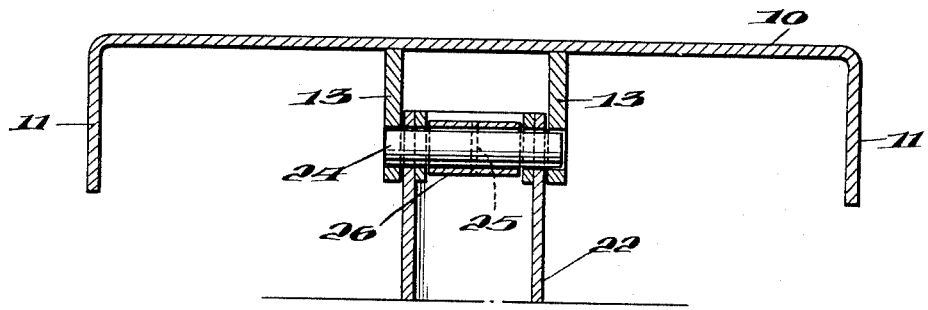
FIG. 10 is a detail cross section through the brace support on the line 10—10 in FIG. 4.

Each of the leg assemblies comprises a cap plate 10 which extends lengthwise of the subframe 8 and should be secured thereto by welding, bolting, riveting, etc. The cap plate 10 is provided with downturned flanges 11 along opposite edges thereof and with depending ears 12 spaced inwardly from the flanges 11 adjacent one end of the cap plate 10, as shown in FIG. 4. A pair of ears 13 should be provided adjacent the opposite end of the cap plate 10, as also illustrated in FIGS. 4, 5 and 10 as hereinafter described.

As shown in FIGS. 4 and 8, a pivot pin 14 extends transversely through the flanges 11 and ears 12 of the cap plate 10 from side to side of the latter. A pair of sleeves 15 depend from the pivot pin 14 and are pivotally supported thereon for swinging movement relative to the cap plate 10. These sleeves 15 are tubular but may be of any suitable cross sectional shape, such as square, rectangular, circular, etc. Telescoped in the sleeves 15 are extension members 16 adapted to project below the sleeves and to be adjusted with respect thereto. The extension members 16 are provided with a foot piece 17, welded or otherwise secured rigidly to the extension members 16 and connecting the latter together for movement as a unit. A spacer plate 18 is interposed between the extension members 16 and may be welded or otherwise secured rigidly thereto so as to hold the extension members properly spaced from each other and to maintain the alignment thereof with the sleeves 15.

The sleeves 15 and extension members 16 form a unitary leg for each corner or supported portion of the container, which leg is capable of swinging movement, as illustrated by the arrow in FIG. 4, from the full line position shown in FIG. 4 to the dotted line position illustrated therein, when it is desired to collapse the leg to a travelling position. A handle is provided at 19, as by an opening formed in the spacer plate 18, to facilitate swinging of the leg to its travelling position.

The leg is capable of lengthwise adjustment, so as to support the container at desired respective elevated positions. Such adjustment may be provided by spaced holes 20 formed in the extension members 16 to receive therethrough a leg lock pin 21 which extends transversely through the tubular members 15 adjacent the lower ends of the latter and through the telescoped extension members 16. By withdrawing the leg lock pin 21, the extension members may be shifted vertically, so as to provide the desired leg length, after which the pin 21 can be re-inserted to lock the leg in its extended relation.

A brace extends diagonally with respect to the assembly and is formed of upper and lower sections 22 and 23, respectively, which are telescoped together and capable of relative swinging movement, as well as being locked in relation to each other.

The upper section 22 is mounted on a pivot pin 24 (FIG. 10) which extends transversely through the depending ears 13 of the cap plate 10. Any suitable means may be provided for anchoring the pivot pin 24 in place, as for example, a transverse locking pin 25 extending therethrough and through a sleeve 26 which is interposed between opposite sides of the channel-shaped brace section 22.

The lower end of the section 23 is pivotally connected by a pin 27 with the lower end portion of the leg. The pin 27 extends through opposite sides of the channel-shaped member 23 and through ears 28 provided on a cross plate 29 that extends between the tubular members 15 and is rigidly secured thereto as by welding.

The interconnected portions of the brace members 22 and 23 are pivoted together on a pin 30, as shown in FIGS. 6 and 7. These interconnected ends are also provided with a brace lock pin extending transversely therethrough, as indicated at 31, and which is spaced lengthwise of the members from the pin 30. The pin 31 is detachable when it is desired to break the holding relation of the brace and to permit the leg to be folded to a traveling position. When the brace lock pin 31 is removed and placed in carrying position, this pin can be inserted into a pipe retainer 32 provided on the brace member 22, as indicated in dotted lines in FIG. 4. It will be retained frictionally in the retainer 32 and will be available whenever it is desired to use the leg for supporting the connected portion of the container.

Also supported by the tie plate 29 is a spring catch 33 in position to engage a keeper 34 provided on the end of the cap plate 10, so as to hold the leg in its collapsed or travelling position, as shown in dotted lines in FIG. 4. This spring catch 33 can be pressed back to release the leg and permit the latter to be dropped to supporting position whenever desired.

To adjust the leg to the desired dock height or to the height of the elevated support desired for the container, it is merely necessary to remove the leg lock pin 21 and to slide the leg extensions 16 up or down with the handle provided at 19 until the required height is attained. Then, the leg lock pin 21 is inserted through the selected holes 20 and the desired length of leg thereby will be obtained. The leg may be moved into traveling position at any dock height adjustment as desired.

The legs are normally folded in travelling positions when the container 7 is in place on the tilting frame 4 of the transport vehicle, as shown in FIG. 1. Thus, the legs do not interfere with either the operation of the vehicle or the loading or unloading of the container with respect thereto.

When the container is moved partially off the transport vehicle, as, for example, to the position shown in FIG. 2 and it is desired to set the container in an elevated position adjacent a loading dock or other elevated support, the rear legs can be lowered as soon as the container has been moved far enough rearward to clear the transport vehicle. When the rear legs are extended, the container is tilted by the tilting movement of the frame 4 until the legs touch the ground. Then, upon forward movement of the transport vehicle relative thereto, the container is shifted off the tilting frame 4. Before it is completely disconnected therefrom, the front legs are lowered to proper heights and moved to extended positions. Then, upon further swinging movement of the tilting frame, the front legs are lowered to rest on the ground and the vehicle is driven out from under the container, as shown in FIG. 3. This leaves the container securely supported on the legs in an elevated position adjacent the dock or other support, as illustrated in FIG. 3.

The leg structure provides secure and rigid supports for the container to hold the latter in an elevated position and yet may be attached to a container of large capacity, providing sturdy and rigid support for the container.

While the invention has been illustrated and described in one embodiment, it is recognized that variations and changes may be made therein without departing from the invention as set forth in the claims.

We claim:

1. A container of the character described, comprising a body portion and a plurality of leg assemblies for supporting the body portion in an elevated position, each of the leg assemblies comprising an elongated cap plate having a pair of spaced-apart flanges, a leg section pivotally suspended from the flanges adjacent one end of the cap plate, said leg section including members laterally spaced-apart, a diagonal brace structure pivotally suspended from the cap plate adjacent the opposite end thereof and extending to the lower end portion of the leg section between the members, a pin connecting the brace structure with the leg section, means for detachably locking the brace structure in extended relation and providing for folding movement of the brace structure and the leg section relative to the cap plate, and means for detachably locking the leg in folded position between the flanges with the brace structure between the members.

2. A container of the character described comprising a body adapted to receive therein and to contain material, and a plurality of leg assemblies for supporting the body in an elevated position, each of the leg assemblies comprising an elongated cap plate mounted on the bottom of the body, said cap plate having depending flange members spaced apart transversely of the cap plate, a leg structure for each cap plate comprising a pair of rigidly connected parallel members connected with the cap plate between the flange members and constructed for collapsing movement substantially within the confines of the flange members and a brace structure connected between the parallel members and the cap plate and foldable with the leg structure between the parallel members.

3. A container of the character described comprising a body adapted to receive therein and to contain material, and a plurality of leg assemblies for supporting the body in an elevated position, each of the leg assemblies comprising an elongated cap plate mounted on the bottom of the body, said cap plate having depending flange members spaced apart transversely of the cap plate, a leg structure for each cap plate comprising a pair of rigidly connected parallel members between the flange members, means pivoting the leg structure to the cap plate at one end portion thereof for folding movement of the leg structure between the flange members, and a diagonal brace structure connected at one end between the parallel members and pivotally connected at the other end with the cap plate adjacent the opposite end thereof and foldable with the leg structure between the flange members.

4. A container of the character described comprising a body portion and a plurality of independent leg assemblies for supporting the body portion in an elevated position, each of the leg assemblies comprising an elongated cap plate having a pair of spaced-apart flanges, a leg section pivotally suspended from the flanges adjacent one end of the cap plate, said leg section including spaced-apart rigidly connected members, a diagonal brace structure pivotally suspended from the cap plate adjacent the opposite end thereof and extending to the lower end portion of the leg section between the members, a pin connecting the brace structure with the leg section, and means detachably locking the brace structure in extended relation and providing for folding movement of the brace structure and the leg section relative to the cap plate between the flanges with the brace structure between the members.

References Cited in the file of this patent

UNITED STATES PATENTS

| | | |
|---|---|---|
| 1,303,854 | Clark | May 20, 1919 |
| 1,713,359 | Thomas et al. | May 14, 1929 |
| 1,895,170 | Nabors | Jan. 24, 1933 |
| 2,172,154 | Perin | Sept. 5, 1939 |
| 2,310,948 | Fitch et al. | Feb. 16, 1943 |
| 2,527,369 | Meyer | Oct. 24, 1950 |
| 2,639,197 | Chelsea | May 19, 1953 |
| 2,656,942 | Helms | Oct. 27, 1953 |
| 2,867,339 | Nelson | Jan. 6, 1959 |
| 2,948,427 | Claas | Aug. 9, 1960 |

FOREIGN PATENTS

| | | |
|---|---|---|
| 704,550 | Great Britain | Feb. 24, 1954 |